June 7, 1932. A. KAZENMAIER 1,861,534
VACUUM OPERATED SERVO BRAKE
Filed July 3, 1930
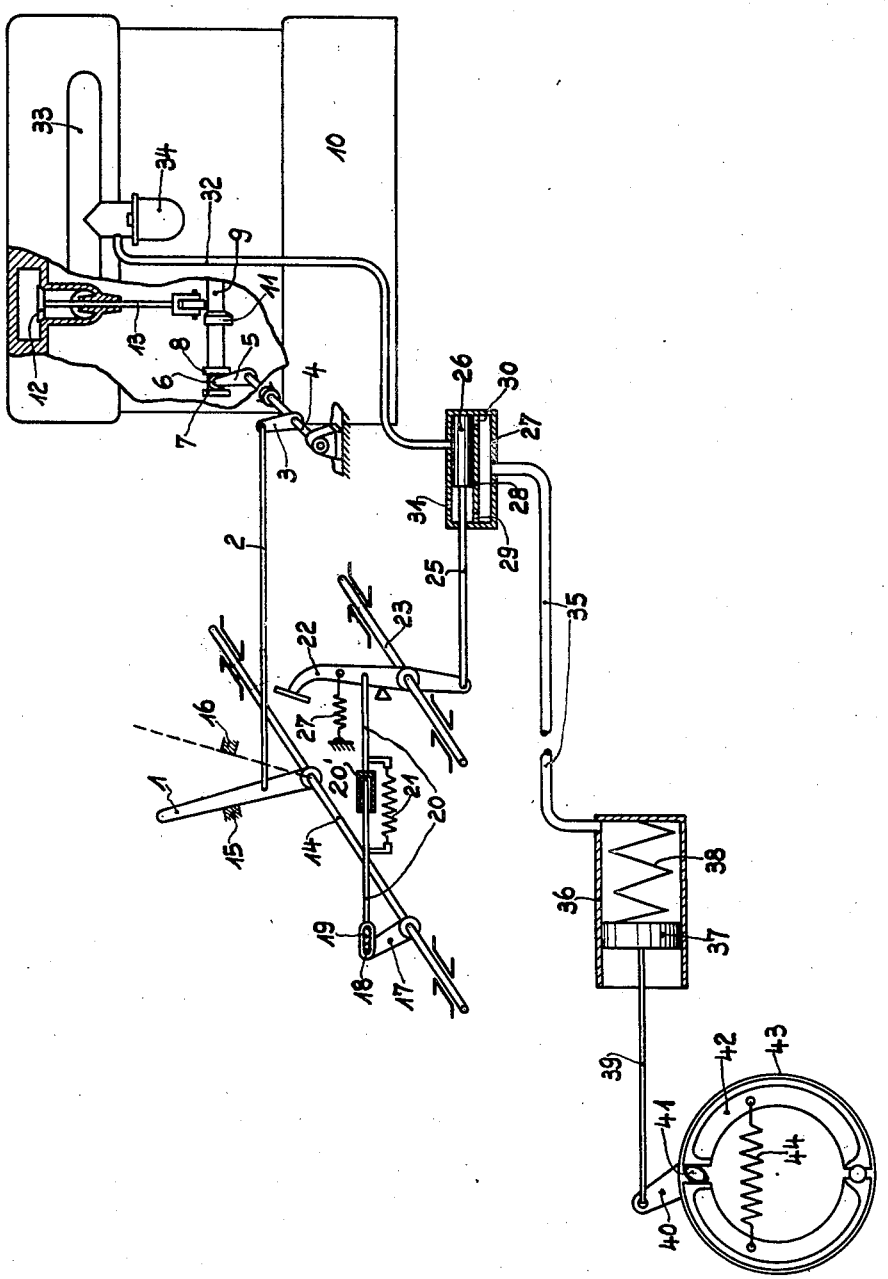
Inventor
August Kazenmaier
by Steward & McKay
his attorneys Patented June 7, 1932

1,861,534

UNITED STATES PATENT OFFICE

AUGUST KAZENMAIER, OF STUTTGART, GERMANY, ASSIGNOR TO ROBERT BOSCH AKTIENGESELLSCHAFT, OF STUTTGART, GERMANY

VACUUM OPERATED SERVO BRAKE

Application filed July 3, 1930, Serial No. 465,723, and in Germany July 10, 1929.

This invention relates to improvements in or relating to vacuum operated servo brakes.

In motor vehicles in which the motor itself can be used as a brake in working as an air pump a considerable amount of the braking action necessary can be done by the engine. The driver likes using the motor as a brake, because it does not involve bodily strain and because he can save the normal brake thereby. This is especially of advantage when making long descents.

Brakes of a motor vehicle are now frequently operated by air suction, the necessary vacuum being produced in the motor itself. A vacuum brake, however, remains inoperative as long as the motor brake is in operation, because no vacuum is produced when the motor is serving as a brake. The driver must therefore, firstly cut out the motor brake before he can use the other brake. This interdependence of the two brakes can under certain circumstances prove disadvantageous, because the driver when operating the vacuum brake does not perhaps think that the motor brake is in operation and on that account the vacuum brake is inoperative and he only realizes this circumstance, very often too late, through the slowing up of the motor vehicle or the relatively great resistance of the brake lever of the vacuum brake.

According to the invention the motor brake is on that account positively cut out when the vacuum brake is in operation.

One form of construction of the invention is shown in the accompanying drawing by way of example.

A rod 2 leads from a hand lever 1 to a lever 3 on a shaft 4. The shaft 4 has a lever 5 with a roller 6 which engages between two stops 7 and 8 on a cam shaft 9 of a motor 10. Cams 11 for operating exhaust valves 12 are mounted on the cam shaft 9. The cam shaft 9 is shown displaced to the left, so that cams 11 do not engage spindles 13 of the valves 12. Only one cam and valve arrangement is shown in the drawing.

The hand lever 1, is keyed on the shaft 14 and its movement is limited by stops 15 and 16. A lever 17 supporting a pin 18 is also mounted on the shaft 14. The pin 18 engages in a slot of a lug 19 formed at one end of a rod 20 which is formed in two portions held together by a spring 21 in such a manner that the end of the one portion is pressed against the bottom of a sleeve 20' formed at the adjacent end of the other portion. The other end of the rod is articulated to a brake lever 22 which is rotatable about an axle 23 and is retained in the position of rest by a spring 27 in the usual manner. A rod 25 extends from the other end of the brake lever 22 to operate a valve 26 in a casing 27. A wall 28 divides the casing into two chambers which are in communication with each other through apertures 29 and 30. The upper chamber or control chamber is in communication with the atmosphere through an aperture 31 and is connected to the suction pipe 33 of the motor 1 by a pipe 32. The carburetter is represented by 34.

The lower chamber of the valve casing 27 is connected by a pipe 35 to a cylinder 36 in which a servo piston 37 works. A spring 38 tends to displace the piston 37 to the left. The piston 37 is connected by a cable 39 to a lever 40 which operates the cam 41 of a brake consisting of brake shoes 42, brake drum 43 and retaining spring 44.

The mechanism works as follows:—

When the lever 1 is moved from its position adjacent the stop 16 shown in dotted lines into the position adjacent the stop 15 shown in full lines, the cam shaft 9 is displaced to the left through the rod 2, lever 3, axle 4 and lever 5 in such a way that cams 11 are drawn away from beneath the valve stems 13 of the outlet valves 12, which valves thus remain closed. As a result of this the motor works as an air pump, that is to say, as a brake.

The lever 17 on the shaft 14 also moves with the lever 1 to the left. The rod 20 is not however, carried along therewith, because the pin 18 slides in the lug 19. In the left hand end position of the lever 17, the pin 18 is disposed at the left end of the lug 19. If the driver now wishes to operate the vacuum brake, he treads on the brake lever 22 so that the valve 26 is drawn to the left in such a way that the connection with the atmosphere through the aperture 31 is interrupted and communication is established with the suction pipe 33 through the pipe 32. The rod 20 and through this the lever 17, and the lever 1 of the motor brake are taken along by the lever 22, because the tension of spring 21 is not overcome by the resistance which the rod of the motor brake offers.

The motor brake is therefore, positively cut out when the brake lever 22 is pressed open so that vacuum is set up in the suction pipe 33 without any further difficulty for the operation of the air suction brake. The connecting aperture of the pipe 32 and the opening 31 are preferably so positioned in relationship to one another and to the valve 26 that when the motor brakes are completely cut out, only a small area of the cross section is released for the suction of air from the brake cylinder. The brakes are thus at first applied gently. If the brakes are to be applied with greater force it is only necessary for the driver to press the brake lever 22 further in the usual manner, thereby extending the spring 21. After the brake lever 22 has been released it is drawn back into the position of rest by its return spring, the portions of the rod 20 being drawn together again by the spring 21. The lever 1 thereby remains in the cut out position at 16.

Any other kind of control can be employed for the vacuum brake instead of to the valve shown in the construction shown by way of example.

What I claim is:

1. A vacuum operated servo brake mechanism which includes a motor adapted itself to serve as a brake or to produce vacuum for operation of said servo brake, control means governing the operation of the motor as a brake and control means for said servo brake, in combination with means for ensuring that the motor brake is inoperative when the control means of the servo brake is operated to apply the servo brake.

2. A vacuum operated servo brake mechanism which includes a motor adapted itself to serve as a brake or to produce vacuum for operation of the servo brake, control means governing the operation of the motor as a brake and control means for the servo brake, in combination with means for moving the motor brake control into a position in which the motor brake is inoperative when the servo brake control is operated to apply the servo brake.

3. A vacuum operated servo brake mechanism which includes a motor adapted itself to serve as a brake or to produce vacuum for operation of said servo brake, control means governing the operation of the motor as a brake and control means for said servo brake, in combination with means for ensuring that the motor brake is inoperative when the control means of the servo brake is operated to apply the servo brake, and means for ensuring that the motor brake remains inoperative on release of the servo brake.

4. A vacuum operated servo brake mechanism which includes a motor adapted itself to serve as a brake or to produce vacuum for operation of said servo brake, control means governing the operation of the motor as a brake and control means for said servo brake, the combination with means for ensuring that the motor brake is inoperative when the control means of the servo brake is operated to apply the servo brake, and means for ensuring that the motor brake control remains in said inoperative position when the servo brake is released.

5. A vacuum operated servo brake mechanism which includes a motor adapted itself to serve as a brake or to produce vacuum for operation of said servo brake, a control lever governing the operation of the motor as a brake and a control lever for the servo brake, in combination with stops limiting the movement of the motor brake lever in both directions and a connection between said motor brake lever and the servo brake lever, said connection including a resilient element of strength greater than the resistance to movement of said motor brake lever between its stops such that movement of the servo brake lever to apply the servo brake first causes displacement of the motor brake lever into its inoperative position whereupon further displacement of the servo brake lever causes extension of said resilient element.

6. A vacuum operated servo brake mechanism which includes a motor adapted itself to serve as a brake or to produce vacuum for operation of said servo brake, a control lever governing the operation of the motor as a brake and a control lever for the servo brake, in combination with stops limiting the movement of the motor brake lever in both directions, a connection between said motor brake lever and the servo brake lever said connection including a resilient element of strength greater than the resistance to movement of said motor brake lever between its stops and means for permitting a limited amount of lost motion between the servo brake lever and the motor brake lever whereby the motor brake lever remains in its inoperative position on release of the servo brake lever.

7. A vacuum operated servo brake mechanism which includes a motor adapted itself to serve as a brake or to produce vacuum for operation of said servo brake, a control lever governing the operation of the motor as a brake and a control lever for the servo brake, in combination with stops limiting the movement of the motor brake lever in both directions, a connection between said motor brake lever and the servo brake lever, said connection including a resilient element of strength greater than the resistance to movement of said motor brake lever between its stops and means for permitting a limited amount of lost motion between the servo brake lever and the motor brake lever equivalent to the amplitude of the motor brake lever between its stops.

In testimony whereof I hereunto affixed my signature.

AUGUST KAZENMAIER.